Figure 1:
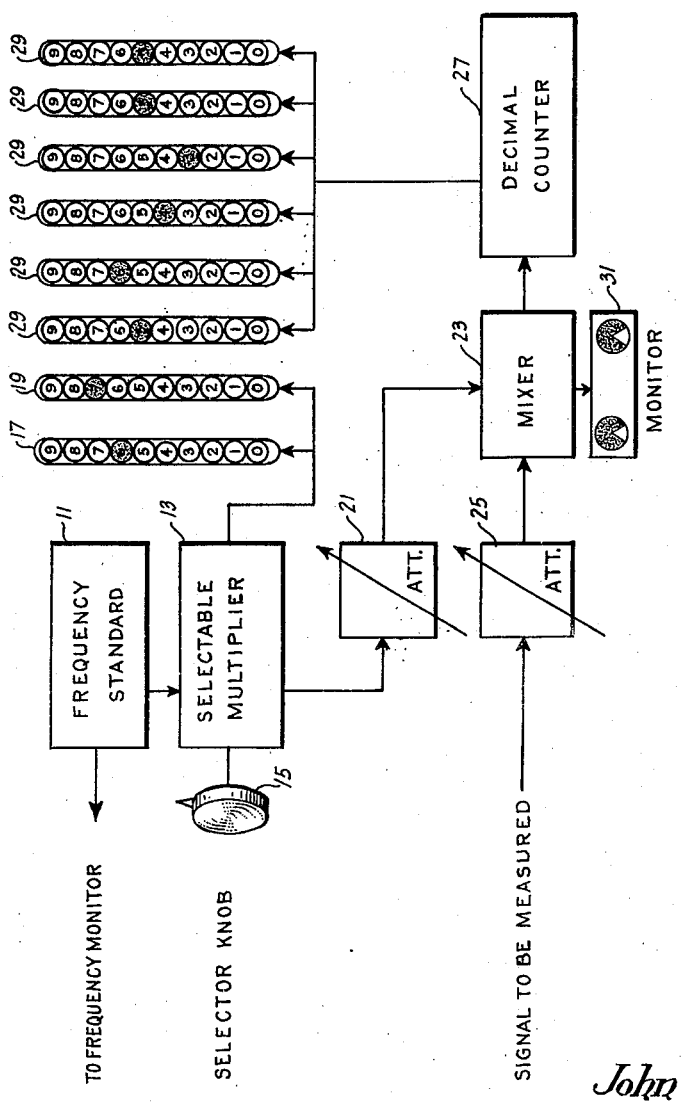

INVENTORS
John L. Corl
James F. Gordon
BY
Lippincott & Smith
ATTORNEYS

2,900,601
Patented Aug. 18, 1959

2,900,601

DIRECT READING FREQUENCY MEASURING DEVICE

John L. Corl, Richmond, and James F. Gordon, Concord, Calif., assignors to Beckman Instruments, Inc., South Pasadena, Calif., a corporation of California Application November 17, 1952, Serial No. 320,951

5 Claims. (Cl. 324—79)

The present invention relates to frequency measuring apparatus in general, and, more particularly, to a measuring circuit employing a summation type digital counter adapted to provide an accurate translation of the desired frequency reading.

Summation type decimal or digital counters are well-known in the art, being capable of reading events per unit time such as, for example, cycles per second. By employing such counters equipped with automatic recycling provisions, readings accurate to plus or minus one cycle per unit time may be obtained; with the counter then being reset for subsequent readings.

Present-day digital counters are restricted in use to the lower frequencies i.e., those below 10 megacycles, because of the rigid requirements imposed on circuit performance at the higher frequencies. Where the counters have been made to perform at frequencies of one megacycle and above, the impedance of the circuits associated with the counter vacuum tubes becomes necessarily quite low. This lower impedance in turn results in much lower current differentials in the counter multivibrator circuits, thus prohibiting the all inclusive use of popular neon glow tubes as indicating devices for the counter without great complication to the circuitry in general. The industry has employed a highly expensive and rather complex substitution of D'Arsonval meter movements to interpret the count representing, for example, the 7th and 8th digits appearing in a frequency reading in conjunction with the use of glow tubes for the first six digits. This arrangement permits frequency readings up to 10 megacycles.

The present invention provides a method of and apparatus for extending the frequency measuring range to approximately 100 megacycles as is herein represented and above when desired without the necessity of resorting to D'Arsonval type meter movements. The invention further permits frequency measurements throughout the range from plus 1 or a very few cycles to substantially 100 megacycles; the reading being directly and digitally expressed.

It is a purpose of this invention to provide a means of heterodyning the incoming signal to be measured with a standard signal of known frequency such that the beat note or difference frequency between the standard frequency and the frequency of the signal to be measured lies within a range measurable by a summation type digital counter operating on relatively low frequencies. The circuit is so arranged that the digital counter reads the amount in cycles per second, for example, by which the incoming signal is greater in frequency than the standard signal. The counter is then adapted to display, as digits, the beat or difference frequency with the standard frequency being displayed to the left of the counter display to provide a reading in conventional Arabic fashion of the frequency of the unknown signal. The circuit is conventionally arranged to display the standard frequency automatically in correct geometrical formation with the difference frequency so that untrained personnel may operate the device of the present invention.

The invention contemplates the employment of such conventional units as crystal controlled oscillators, harmonic selectors, switching devices and mixers or modulating circuits; the harmonic selectors being employed in conjunction with a stable oscillator to select remote harmonics produced thereby, which harmonics may be utilized or combined as desired to provide standard frequencies throughout large ranges, thus providing wide band frequency measuring apparatus. It should be readily apparent that the accuracy of such apparatus is the instantaneous sum of the decimal counter error plus the error in the standard frequency. Since the counter will provide readings to plus or minus one cycle, and since the standard frequency may be held to a very few cycles, the overall measuring accuracy is of a very high order.

Accordingly, among the objects of the present invention are the following: the provision of direct reading frequency measuring apparatus admitting of accurate data translation without necessitating complicated test setups; the provision of simplified apparatus of this character capable of being operated by inexperienced personnel; the provision of wide band frequency measuring apparatus having substantially uniform accuracy of a high order throughout the wide band of frequencies measurable; and the provision of a method of measuring the frequencies of electrical waves and automatically displaying the desired data in digital fashion.

Figure 2:
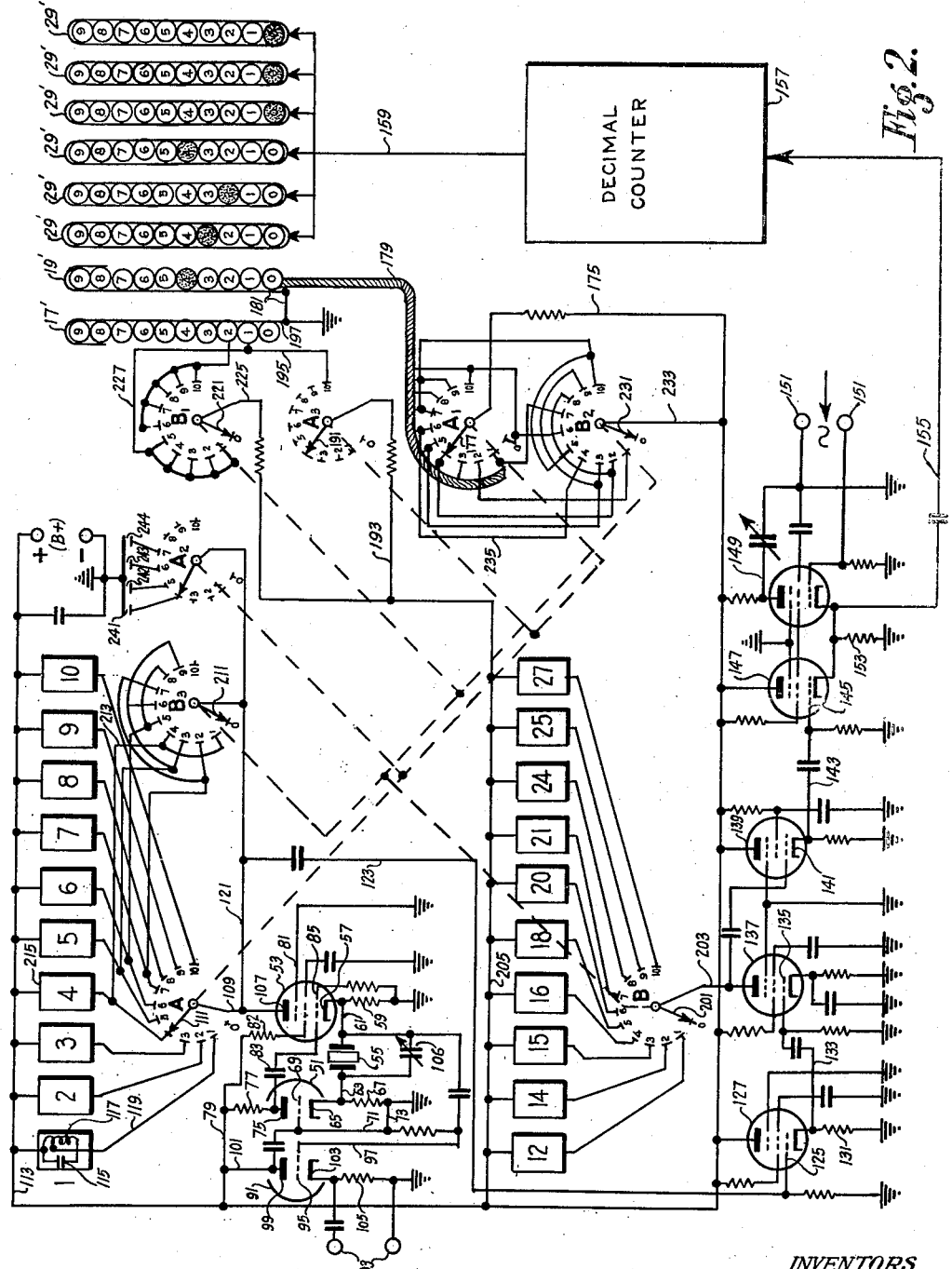

Other and further objects of the present invention will become apparent to those skilled in the art from a reading of the following detailed description thereof when taken in the light of the accompanying drawings wherein:

Fig. 1 depicts, in block form, basic units as employed in combination in accordance with the principles of the present invention; and Fig. 2 is a representative circuit diagram showing in detail one suitable arrangement of frequency measuring apparatus in accordance with the present invention.

Referring now to Fig. 1, there is shown, in block form, a frequency standard 11 which may represent a crystal controlled oscillator or stable harmonic generator adapted to supply a standard or reference frequency to a selectable multiplier 13. The unit 13 may comprise selective harmonic filters per se or such filters in combination with means for combining certain of the selected harmonics in order to provide standard or reference frequencies of high orders. A selector knob 15 provides the selection or multiplication as desired, with the selected frequency standard being automatically set on the left hand indicator columns 17 and 19. These indicator columns may comprise conventional digital display units each provided with, for example, ten gaseous discharge tubes of the neon glow variety having numeral designators associated therewith, such that light supplied by the glow discharge tubes serves to illuminate the selected digits. The selected frequency standard is also passed through an adjustable attenuator pad 21 to a mixer or modulator 23 which also receives the unknown signal to be measured from an attenuator pad 25. The mixer or modulator 23 provides the difference frequency or beat note obtained from the combination of the selected frequency standard and the signal of unknown frequency, which difference frequency is within the registerable range of a summation type decimal or digital counter 27 and which serves to illuminate the appropriate digits on display columns 29. Accordingly, direct reading of the unknown signal frequency may be had from the columns 17, 19 and 29.

For purposes of example, assume that it is desired to measure a frequency of 67,564,355 cycles per second. The operator adjusts the selectable multiplier 13 to select a frequency standard of 67 megacycles, which frequency is applied to the mixer 23 and also is indicated on the columns 17 and 19. The signal of unknown frequency is then introduced into the mixer 23 and a difference frequency of 564,355 cycles per second is applied to the decimal or digital counter 27, the sum frequency, i.e., 67 megacycles plus 67,564,355 cycles is, of course, too high to affect the digital counter 27. Therefore, the difference frequency (comprising the decimal portion of the unknown frequency in respect to megacycle units) is displayed on the columns 29 to be read in Arabic fashion in conjunction with the 67 megacycles (comprising the integral portion of the unknown frequency as expressed in megacycle units) displayed on columns 17 and 19.

Presumably, an operator having need for a device as accurate as the measuring apparatus of the instant invention would know approximately the frequency of the unknown signal, and, therefore, would be able to select a frequency standard of 67 megacycles in the instant situation. However, if the operator did not know that the frequency of the unknown signal exceeded 67 megacycles, he would merely need turn the selector knob until he obtained two readings. In the example herein presented, such readings would be the correct reading of 67,564,355, and an erroneous reading of 68,435,645; all other selectable frequency standards yielding a difference frequency, when combined with the unknown signal, in excess of one million cycles per second, which if not beyond the realising capabilities of the counter, would at least cause the counter to indicate 999,999 cycles per second. Between the two readings obtainable the operator would at once recognize the correct reading as it must necessarily be the reading obtainable when employing the lower frequency standard.

The invention has been illustrated in Fig. 1 as employing eight reading columns and, accordingly, the example herein presented has exceeded ten megacycles. It will be appreciated, however, that the particular number of columns employed is within the option of the manufacturer; being dictated only by the range of readings to be encompassed. Likewise, the provision of the attenuator pads 21 and 25 is optional, their function being merely to supply the mixer 23 with the most desirable amplitude or energy ratios of standard and unknown signals. Further, if desired, monitors may be connected to the frequency standard 11 and the mixer 23 as is indicated at 31.

The representative circuit of Fig. 2 is one operating on a basic frequency of one megacycle in order to illustrate the measuring technique through the description of simplified circuitry. The frequency standard 11 depicted in block form in Fig. 1 may be considered to comprise a crystal controlled oscillator including a grounded grid triode section 51 and a driver pentode 53. The pentode functions as a cathode follower in driving a crystal 55 which may conveniently be of the silver plated wire mounted CT cut variety, one terminal of the crystal being connected between the cathode 57 of the pentode 53 and cathode resistor 59 by conductor 61. The other terminal of the crystal is connected via lead 63 between the cathode 65 and cathode resistor 67 of the triode 51. This latter connection couples crystal energy at the series resonant crystal frequency to the cathode of the triode 51, the control grid 69 thereof being grounded over leads 71 and 73 to cause the tube 51 to function as a grounded grid amplifier at the crystal frequency. The plate 75 of the triode 51 is connected through a load resistor 77 to a common B+ supply line 79 which also supplies the screen grid 81 of the pentode 53 through dropping resistor 82. The plate 75 of the grounded grid amplifier 51 is connected through a capacitor 83 to the control grid 85 of the driver pentode 53, thereby completing the oscillatory circuit. This type of oscillator is chosen for illustration because of its frequency stability, but other stable types may of course be employed.

The left hand triode section 91 is conveniently provided to supply a monitor (not shown) with energy at the crystal frequency over terminals 93, to indicate that the reference oscillator is in operation. The control grid 95 of this triode section is connected via lead 97 to the oscillatory circuit, the plate 99 connecting to B+ supply line 79 over lead 101, and the cathode 103 being provided with a cathode resistor 105 across which the monitor terminals 93 are supplied in cathode follower fashion, thereby realizing frequency sampling without interfering with the oscillator circuit.

For purposes of explanation of the operation of the circuit of Fig. 2, it may be assumed that the crystal 55 is operating at 500 kilocycles, an adjustable trimmer 106 being provided in parallel with the crystal 55 for exact adjustment. The plate 107 of the driver pentode 53 is connected via lead 109 to a manually operable wiper or contactor 111 operating as switch A. Switch A is provided to connect the driver pentode 53 through any one of the units designated by the numerals 1 through 10 to B+ supply head 113 considered as A.C. ground. The units 1 through 10 may be regarded as multipliers or harmonic selectors comprising, as is indicated, in the open box marked 1, a parallel resonant circuit including a capacitor 115 and a tapped inductor 117 in electric connection with switch position 1 over lead 119. In the example herein presented, the numeral designations represent resonant frequencies in megacycles, and, accordingly, switch A is adapted to connect any of the harmonic selectors capable of developing 1 through 10 megacycle frequencies in integral units in the plate circuit of the driver pentode 53, the selected harmonic being passed over leads 121 and 123 to the control grid 125 of a pentode 127 connected as a cathode follower stage.

The operation of the circuit as now described will be explained in connection with an assumed value of an unknown signal frequency exceeding 4 megacycles. The operator merely turns switch A through a control shaft or knob to set the contactor 111 on position 4 (as is depicted in Fig. 2) to provide a stable reference or standard frequency of 4 megacycles delivered to the follower stage comprising tube 127 over the leads 121 and 123. This reference frequency is then passed from the cathode resistor 131 via lead 133 to the control grid 135 of a further frequency multiplier circuit comprising the tube 137 (later to be described). In the instant situation, the four megacycle frequency is transferred to a further cathode follower stage comprising the tube 139 and then from the cathod 141 via lead 143 to the control grid 145 of a pentode 147 operating in conjunction with a pentode 149 as a conventional mixer circuit.

The signal of unknown frequency to be measured is applied to mixer tube 149 across terminals 151 with the output of the mixer being taken from common cathode resistor 153 and applied via lead 155 to a decimal or digital counter 157 of the summation type. It will be recalled that both the sum and difference frequencies produced in the mixer are passed via lead 155 to the digital counter 157; the sum frequency being beyond the comprehension of the counter, thus resulting in only a registration of the difference frequency. Assuming now that the frequency of the signal applied to terminals 151 as 4,324,000 cycles per second, only the decimal portion thereof exceeding 4 megacycles, i.e., 324,000 is counted by the digital counter 157. This frequency is accordingly expressed in digital fashion on the six columns 29′ under the control of the digital counter 157, the lead 159 representing a plurality of connections to the individual indicator lamps of the six columns.

The integral portion of the frequency being measured is expressed digitally, i.e., the 4 megacycles, or in other words, the largest unit capable of being used to express the frequency of the signal being measured is automatically and mechanically set on the columns 17′ and 19′ appearing to the left of the decimal expressing columns 29′. This is accomplished by switch $A_1$ which is ganged to switch A and operative therewith, switch $A_1$ being set on position 4 to extend the 4 megacycle reference frequency established by switch A via conductors 175, through contactor 177 and multiple conductor cable 179, through indicator lamp 4, and thence to ground via conductor 181; thereby providing a digital expression, readable in Arabic fashion, on columns 19' and 29' of the frequency of the signal being measured.

In the example presented, switch $A_3$ which is also ganged to switch A was not relied upon for effecting the expression of the measured frequency. However, if the frequency being measured lies between 10 and 11 megacycles the contactor 191 of switch $A_3$ is positioned on 10 to provide a circuit through conductors 193 and 195 and extending to ground via lead 197 for illuminating the digit 1 appearing on column 17'. It will be understood that reference movement of contactor 111 of switch A to position 10 for establishing a reference frequency of 10 megacycles automatically sets contactor 191 of switch $A_3$ on position 10 to illuminate the left hand integer thereof, the right hand integer, i.e., 0, being illuminated through switch $A_1$ having contactor 177 in the 10 position to complete the circuit through the indicated lamp 0 via conductor 181.

From the foregoing it will be noted that operation of switches A through $A_3$ (switch $A_2$ being described hereinafter) only is necessary to provide reference frequencies of 1 through 10 megacycles. In order that reference frequencies of higher order than 10 megacycles may be obtained from the instant circuit, it is necessary to employ certain or all of the switches designated as B through $B_3$, these switches being mutually ganged as is the case with the A switches.

Main switch B is provided with a contactor 201 adapted to complete frequency multiplying circuits via the plate connection 203 of the multiplier tube 137 through any of the filters or harmonic selectors designated by the units respectively marked as 12, 14, 15, 16, 18, 20, 21, 24, 25 and 27 to B+ terminal 205. Each of these units is identical to the unit designated as 1 comprising the capacitor 115 and the inductor 117 with the exception, of course, that the individual units are tuned to the frequency in megacycles specified thereon. Accordingly, if a reference frequency of 16 megacycles is desired, contactor 201 of switch B is set in position 4 with switches $B_1$ through $B_3$ automatically assuming corresponding settings. Switch $B_3$ completes a first multiplying circuit through its contactor 211, via lead 213, through the 4 megacycle harmonic selector 215, and thence through the oscillatory circuit of the reference oscillator comprising pentode 53, the 4 megacycle frequency being applied via conductors 123 to the control grid 125 of the cathode follower stage 127 and onto the control grid 135 of the multiplier stage 137, through lead 203 and contactor 201 of switch B to the harmonic selector designated by the numeral 16. The 16 megacycle reference frequency is then applied to the mixer tube 147 to be combined with the signal of unknown frequency inserted at terminals 151 whereupon the difference frequency is illuminated on column 29' in the manner hereinbefore described.

In order that the reference frequency, i.e., 16 megacycles, may be displayed on the columns 17' and 19', switches $B_1$ and $B_2$ are respectively employed to designate the numerals 1 and 6. Switch $B_1$ having its contactor 221 in position 4 completes an electrical circuit from B+ through conductor 205, conductor 225 and switch lead 227 to ground via conductor 197 through indicator lamp 1. Switch $B_2$ having its contactor 231 set on position 4 completes a similar circuit from B+ via conductor 233, through common switch lead 235 and cable 179 to ground through indicator lamp 6, thereby completing the Arabic expression of the reference frequency.

Discussion of the function of the switch $A_2$ has been omitted until now because this switch and its associated circuitry are employed only if the second multiplier circuit comprising tube 137 is included in the measuring apparatus. When certain of the inductors included in units 1 through 10 are used by both the A and B switch assemblies, it is desirable to include means to compensate for the difference in circuit loading. This compensation may take the form of individual trimmer capacitors consecutively numbered from 241 through 244 connected respectively between positions 4 through 7 on switch $A_2$ and ground. Thus, switch $A_2$ performs the function of effectively adding a capacitor across the tank circuit section or harmonic filters for units 4 through 7, thereby compensating for the change in loading on these positions. It will be appreciated, however, that switches A through $A_3$ are all set on 0 and are consequently inoperative when reference frequencies exceeding 10 megacycles are desired. Likewise, switches B through $B_3$ are set on 0 and inoperative when switch A is controlling the reference frequencies from 1 through 10 megacycles.

In the representative circuit shown in Fig. 2, it may be noted that certain integral reference frequencies are missing, i.e., 11, 13, 17, 19, 22, 23 and 26 megacycles. These frequencies are not multiples of any values between 2 and 10 and it is considered undesirable to multiply by more than a factor of 7 because of the predominance of spurious responses. It will be appreciated, however, that provisions for supplying the missing reference frequencies may readily be made. However, this would further complicate the circuitry herein described while adding nothing principle-wise to the invention.

In line with the foregoing, mixing and double heterodyning techniques are within the contemplation of the present invention as one suitable means for providing the missing reference frequencies and extending the measuring range of the apparatus disclosed. It will also be appreciated that the employment of 8 display columns is only by way of example as is indeed also the case in assuming a 500 kilocycle crystal. Obviously, the crystal frequency may be lowered or raised, and the harmonic filters altered in frequency selection if desired to provide measuring apparatus capable of operation throughout various ranges.

What is claimed is:

1. Frequency measuring apparatus comprising in combination, a source of constant reference frequency output, selectable multiplier means connected to said source to provide constant frequency outputs of higher order frequencies than the reference frequency, a differential circuit connected to receive a selected frequency output from the multiplier means and an input frequency to be measured to provide as an output the difference frequency therebetween, summation type decimal counting means connected to receive the difference frequency from the differential circuit and display the same as digits, and indicator means connected to receive the selected frequency output from the multiplier means and display the same as digits to be read with the counting means display.

2. Frequency measuring apparatus comprising in combination, a source adapted to supply a plurality of constant reference output frequencies, selectable multiplier means connected to said source to provide constant output frequencies of higher order than the reference frequencies, a differential circuit connected to receive a selected output frequency from one of the multiplier means and source and an input signal frequency to be measured to provide as an output at least the difference frequency therebetween, summation type digital counting means connected to receive the difference frequency from the differential circuit and display the same as digits, and indicator means connected to receive the selected frequency output from the multiplier means and display the same as digits to be read with the counting means display.

3. Apparatus for measuring the frequencies, of unknown signals and displaying the same as digits comprising in combination, means for developing a plurality of constant reference frequencies one of which being substantially equal to the integral portion only of the unknown frequency as expressed in the left hand digit or digits thereof, means for displaying the integral portion of said one of the constant frequencies as digits, means for obtaining the difference frequency between said one of the constant frequencies and the unknown frequency, switching means for applying said one of the constant frequencies to the means for displaying and to the means for obtaining the difference frequency, summation type digital counter means connected to receive and count the difference frequency, and means to display the so-counted difference frequency as digits comprising the decimal portion of the unknown frequency as read in conjunction with the digital displayed integral portion thereof.

4. Apparatus for determining and displaying in digital fashion the frequencies of signals to be measured comprising in combination, means to develop constant reference frequencies one of which is less than the signal frequency to be measured by the decimal portion thereof as determined by the amount the signal frequency exceeds the largest unit usable to express the same, means for combining said one of the reference frequencies and a signal having a frequency to be measured to obtain the difference frequency therebetween, counting means responsive to the difference frequency, means responsive to the means to develop said one reference frequency for displaying in digital fashion said one reference frequency, and means responsive to the counting means for displaying in digital fashion the difference frequency to be read in conjunction with the digitally displayed one reference frequency.

5. A direct-reading frequency meter comprising in combination an array of indicators each adapted to display one digit of a frequency to be measured in terms of an integral portion and a fractional portion of said frequency expressed in selected units, means for generating a standard frequency of an integral value in said units, means for developing from said standard frequency a plurality of integral multiples thereof, switching means for selecting a desired one of said integral multiple frequencies and concurrently exciting corresponding indicators of said array to display digits representative of the integral portion of the frequency to be measured, a mixing circuit connecting through said switching means for excitation by said selected frequency, an input circuit connecting to said mixing circuit for supplying an unknown frequency thereto, means connecting to said mixing circuit for selecting therefrom the difference frequency between said unknown frequency and said selected integral frequency, digital counting means responsive to said difference frequency, and connections from said digital counter to the respective indicators of said array representative of the fractional portion of said frequency.

References Cited in the file of this patent

UNITED STATES PATENTS

| | | |
|---|---|---|
| 2,324,077 | Goodale et al. | July 13, 1943 |
| 2,539,673 | Peterson | Jan. 30, 1951 |
| 2,604,263 | MacSorley | July 22, 1952 |